INVENTORS.
HAROLD W. PRICE
EARL R. PRICE
BY
H. O. Clayton
ATTORNEY.

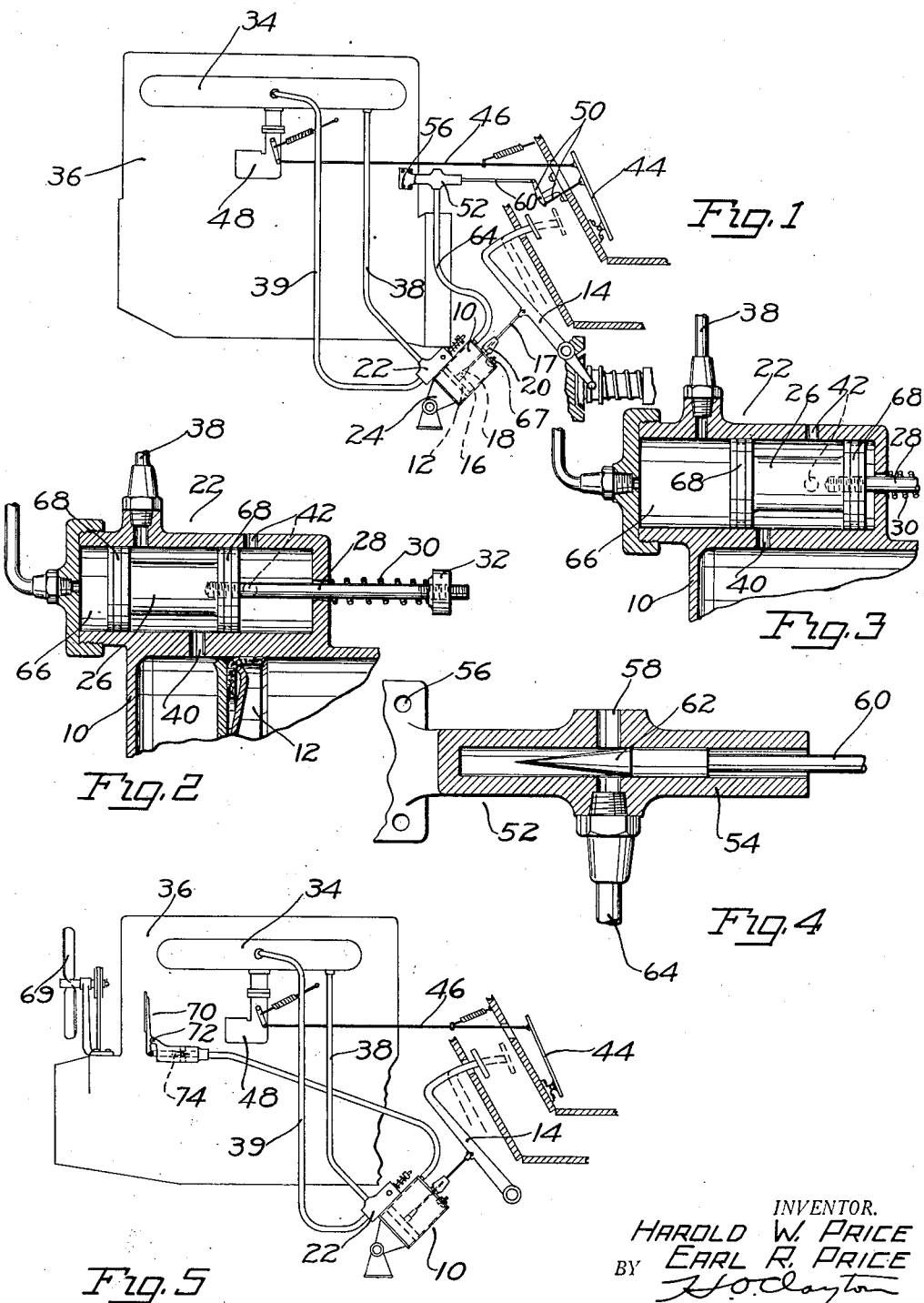
July 13, 1937. H. W. PRICE ET AL 2,086,575
CLUTCH CONTROL MECHANISM
Filed Oct. 16, 1931 2 Sheets-Sheet 1
INVENTOR.
HAROLD W. PRICE
BY EARL R. PRICE
ATTORNEY July 13, 1937.   H. W. PRICE ET AL   2,086,575
CLUTCH CONTROL MECHANISM
Filed Oct. 16, 1931   2 Sheets-Sheet 2

UNITED STATES PATENT OFFICE 2,086,575

CLUTCH CONTROL MECHANISM

Harold W. Price and Earl R. Price, South Bend, Ind., assignors to Bendix Aviation Corporation, South Bend, Ind., a corporation of Delaware Application October 16, 1931, Serial No. 569,226

2 Claims. (Cl. 192—.01)

This invention relates in general to control mechanisms and in particular to a vacuum operated clutch controlling mechanism for an automotive vehicle.

It is the principal object of the invention to provide a vacuum operated fluid motor and cooperating valve structure for effecting both a disengagement and a regulated engagement of the clutch, the control valve for said motor being automatically opened by vacuum with the closing of the engine throttle and automatically closed by other means during the opening of the throttle.

More specifically, it is an object of the invention to provide an improved form of power operated valve mechanism actuated by the variations of fluid pressure which effect the movements of the piston of a fluid motor. In the application of the invention illustrated in the drawings the particular object is to automatically control the connection and disconnection of the drive clutch of an automobile, independent of the conventional clutch pedal manipulation, whereby when the throttle valve is opened the clutch is allowed to gradually and uniformly engage, thereby starting the vehicle without shock, and upon the closing of the throttle valve, as by lifting the operator's foot from the accelerator pedal, the suggested mechanism will automatically disconnect the clutch. By this means the vehicle is controlled solely through the throttle, preferably by means of the accelerator pedal.

The above and other objects of the invention and desirable details of construction and combinations of parts will become apparent from the following detailed description of certain preferred embodiments of the invention taken in conjunction with the accompanying drawings, in which:

Figure 1 is a diagrammatic view disclosing the various elements operating to constitute the invention;

Figure 2 is a longitudinal sectional view through the automatically operable control valve for the fluid motor of the invention, the valve parts being shown in their open position;

Figure 3 is a view similar to that of Figure 2 but showing the valve parts in their closed or vented position;

Figure 4 is a longitudinal sectional view through the valve controlling the clutch engagement;

Figure 5 is a diagrammatic view disclosing the essential elements of the invention of Figure 1 with the incorporation therein of a modified form of clutch engaging control valve.

Figure 6:
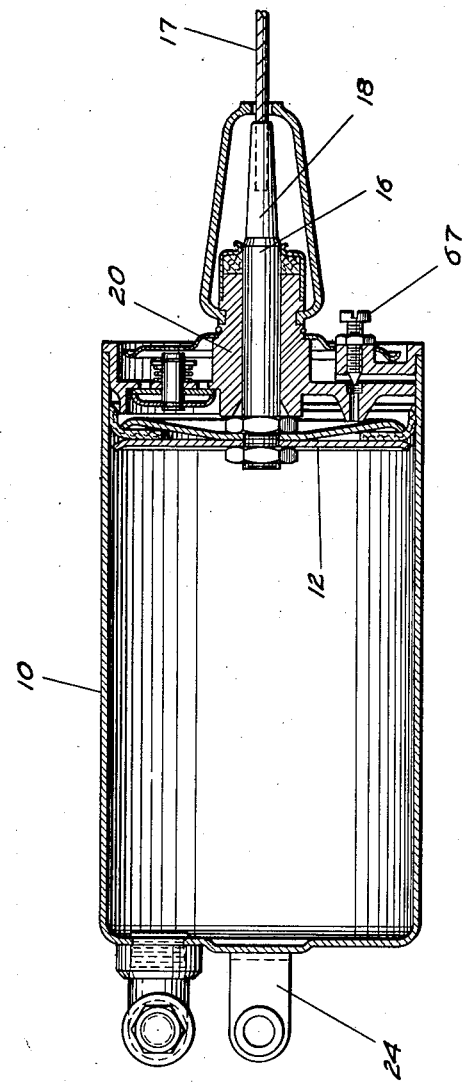
Figure 6 is a sectional view disclosing the fluid motor in detail.

The present invention relates to mechanism adapted to actuate the clutch pedal against the tension of its spring, not shown, to thereby disengage the clutch elements and likewise adapted to automatically govern the reengagement of the driving clutch element under the influence of the clutch spring, the latter thereby controlling the retractive movement of the clutch pedal.

In that embodiment of the invention disclosed in Figures 1 to 4 of the drawings there is provided a clutch operating fluid motor comprising a double-ended cylinder 10 disclosed in detail in Figure 6, having therein a reciprocatory piston 12 operatively connected with a conventional clutch pedal 14 by a rigid rod 16 and flexible cable 17. The rod is preferably provided with a tapered end portion 18, the entire rod being reciprocable within a bored hub portion 20 projecting from the end of the cylinder 10. This construction is not claimed herein, being more fully described in our Patent No. 1,996,256, dated April 2, 1935.

The cylinder 10 is provided at one end with a valve cylinder 22 rigidly secured thereto as by casting, and within which cylinder there is provided the movable valve parts for controlling the operation of the fluid motor. The end of the cylinder is provided with a projection 24 pivotally secured to a fixed portion of the chassis.

Mounted to reciprocate within the valve cylinder 22 there is provided a spool-shaped plunger or piston member 26, the connecting rod 28 of which passes through one end of the cylinder, a return spring 30 being interposed between the outer face of the cylinder and a stop 32 on the piston rod to urge the piston to the right or open position, as disclosed in Figure 3. The cylinder 22 is connected to one end of the intake manifold 34 of an internal combustion engine 36 by a flexible conduit 38 and is also connected by conduit 39 with the manifold at a point just above the carburetor 48. Communication between the motor and valve is provided by an opening or port 40. Atmospheric ports 42 adjacent the right end of the valve cylinder serve to deenergize the motor to permit the clutch engagement.

The clutch operating mechanism is completed by a conventional accelerator pedal 44 connected by rod 46 with the carburetor, the pedal also being provided with linkage 50 operable to control a needle valve 52 disclosed in detail in Figure 4. The valve 52 comprises a bored casing member 54 rigidly secured to the engine at 56, which casing is transversely bored intermediate its ends to provide an atmospheric port 58 providing a vent for the compression side of the actuator piston 12. A rod 60 forming a part of the aforementioned accelerator operated linkage is provided at its end with a tapered projection 62 constituting, together with the ported casing, a needle valve construction for controlling the communication, via a conduit 64, between the atmosphere and the compression side of the motor piston 12.

Describing the operation of the mechanism, closing of the throttle by the release of the accelerator pedal effects the creation of a vacuum in the manifold by the pumping action of the engine pistons. As is well known in the art, this evacuated condition of the manifold is employed as a source of energy in the operation of accessories, such as the wind shield wiper and fuel storage vacuum tank.

A partial vacuum is thus immediately induced in the valve compartment 66 at the left of the valve member 26, this action being accelerated by virtue of the connection of conduit 39 with the manifold 34 at a point just above the carburetor, an area of maximum vacuum. The connection of conduit 38 at the end of the manifold and the mounting of the valve on the motor accentuate this effect by virtue of the mode of air flow between the several parts of the mechanism. The spool valve member 26 is thus automatically drawn to the left under the pressure of the atmosphere, compressing spring 30 and registering the port 40 with the conduit 38, which position of the valve parts is disclosed in Figure 2. The valve is thus opened to effect an evacuation of the motor and a disengagement of the clutch, the motor piston 12 assuming the position shown in dotted lines in Figure 1. A one-way check valve 67 of conventional structure insures the movement of the piston during the clutch disengaging operation, the piston impelling air entering the actuator via said valve prior to the opening of the bore in hub 20.

Upon opening the throttle, for example, after the shifting of gears, the gaseous pressure within the manifold and valve compartment 66 is increased, tending to approach normal atmospheric pressure whereupon the valve spring 30 moves the valve member 26 to the right, as disclosed in Figure 3, to vent the actuator via atmospheric ports 42, and port 40. The clutch spring then functions to reengage the clutch, the movement of the driving clutch plate being controlled, however, by the variable throttle control of the efflux of air from the compression or right side of the actuator piston 12.

This control is effected by virtue of the entry of the tapered end 18 of rod 16 within the hub 20 and also by the adjustment of the needle valve 52, the latter depending upon the position of the accelerator pedal. There is thus provided a definite mode of clutch engagement depending upon the degree of throttle opening. With a relatively small throttle opening, as in clutching during low and reverse gear changing operations, the clutch is engaged slowly and with the throttle opening rather wide, as during the engagement of the clutch after shifting into intermediate and high gears or after a "free wheeling" operation, the clutch is engaged rather quickly. The usual manual control of the clutch is thus simulated by the aforementioned power operated mechanism.

The valve member 26 may be provided with friction rings 68 to obviate an undue degree of movement with slight changes in manifold vacuum caused, for example, by the temporary cutting out of one or more engine cylinders.

Referring to both the engagement and disengagement of the clutch, the relative timing of the throttle and clutch operations may be varied by changing any one of the many variables, such as the idle setting of the throttle, the relative sizes of the valves and actuator, strength of springs, etc.

In Figure 5 there is disclosed a modified form of clutch engaging control valve wherein a conventional cooling fan 69 of the engine serves to propel or blow air upon a shield or baffle 70, the latter being pivotally mounted at 72 and serving to actuate a needle valve member 74 pivotally connected thereto. The degree of opening of the needle valve and the proportionate rate of clutch engagement is, therefore, made a function of the opening of the throttle and, accordingly, a function of the R. P. M. of the fan which is geared to the engine. As with the former construction the rate of clutch engaging movement is thus increased with the opening of the throttle. The mechanism disclosed in Figure 5 is described in detail and claimed in our divisional application No. 137,624, filed April 19, 1937.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In a clutch control mechanism for an automotive vehicle provided with an internal combustion engine having an accelerator operated throttle and also provided with a clutch, a fluid motor, an operative connection between said motor and clutch, a fluid transmitting connection between said motor and the manifold of the engine, a three-way vacuum operated control valve for the motor interposed in the aforementioned connection, and a second fluid transmitting connection between said valve and manifold whereby said valve is automatically operated, to render operative the fluid motor to disengage the clutch, with the idling of the internal combustion engine by the release of the accelerator pedal, and means, cooperating with said motor and also operable by the accelerator pedal, to regulate the mode of rendering the motor operative to effect a controlled reengagement of the clutch.

2. In a clutch control mechanism for an automotive vehicle provided with an internal combustion engine having an intake manifold and also provided with a clutch, a fluid motor, an operative connection between said motor and clutch, a fluid transmitting connection between said motor and the manifold of the engine, a three-way vacuum operated control valve for the motor interposed in the second mentioned connection, said valve comprising a casing provided with an atmospheric port, a second port connected with the motor and a third port connected with the aforementioned fluid transmitting connection, a reciprocable spool-shaped piston member within said casing, a rod secured to said piston member and extending through and projecting beyond one end wall of said valve casing, a stop member on the end of said rod, and a return spring interposed between said stop and casing, a second fluid transmitting connection between the other end wall of said valve casing and the manifold, said parts being so constructed and arranged to effect an operation of the valve piston by vacuum to intercommunicate the manifold and fluid motor to disengage the clutch with the idling of the internal combustion engine, said valve being further automatically operated by the aforementioned return spring to intercommunicate the atmosphere and fluid motor to effect an engagement of the clutch with the acceleration of the internal combustion engine.

HAROLD W. PRICE.
EARL R. PRICE.